March 1, 1927.    W. M. CROFTON    1,619,656

CARBURETOR

Filed Oct. 20, 1923

INVENTOR
William Mervyn Crofton,
Byrne, Stebbins & Parmelee,
his attys.

Patented Mar. 1, 1927.

1,619,656

UNITED STATES PATENT OFFICE.

WILLIAM MERVYN CROFTON, OF DUBLIN, IRELAND.

CARBURETOR.

Application filed October 20, 1923, Serial No. 669,691, and in Great Britain November 13, 1922.

This invention is for improvements in or relating to carburetors particularly for internal-combustion engines, and has for its main object to provide an improved form of carburetor which is easy to manufacture and will be more effective in operation than carburetors as at present used.

The carburetor according to this invention is of the type which comprises an inner air-tube, a surrounding or outer air-tube and a fuel nozzle opening into the inner tube, there being a valve or valves in the outer tube.

According to the present invention a valve is arranged in the outer tube contiguous with that end of the inner tube which is nearer the engine and in such manner that on being opened it first completely uncovers the end of the inner tube and then progressively opens the space between the two tubes.

The valve is preferably of the iris diaphragm type, and is placed so that the leaves of the diaphragm move very close to, but not actually in contact with, the end of the inner tube, thereby ensuring that the inner tube is uncovered before the space between the tubes begins to be opened.

When a second valve is employed at the other end of the inner tube, it is preferably arranged in the same manner as the valve first mentioned, and is preferably also of the iris diaphragm type.

The inner tube may be of uniform cross-section throughout its length, but is preferably provided with a venturi constriction at the point where the jet enters it.

A carburetor according to the present invention is illustrated in the accompanying drawings, in which.

Figure 1:
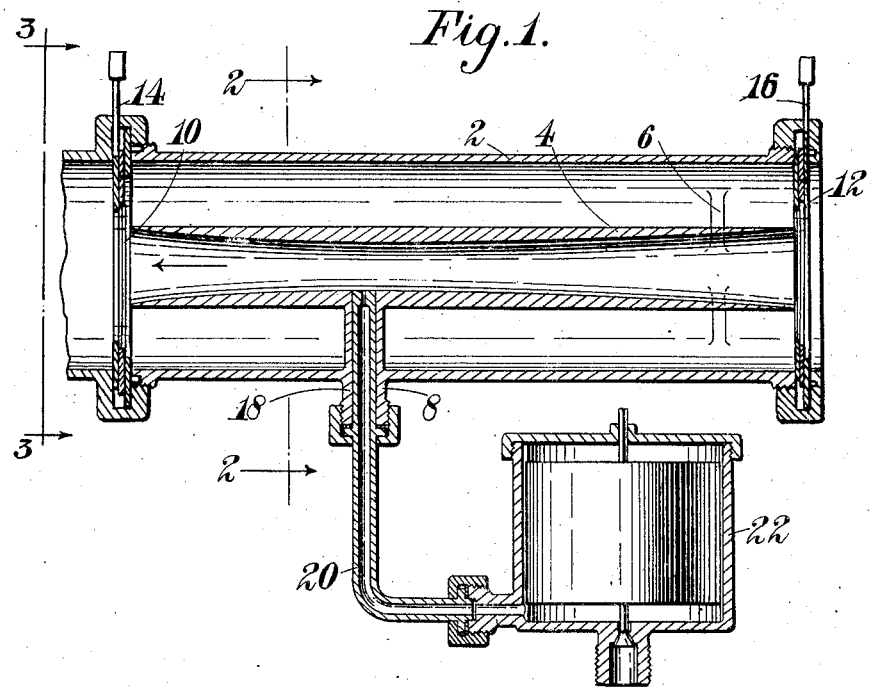
Figure 1 is a sectional elevation.
Figure 3:
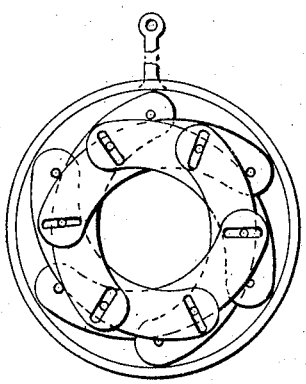
Figure 3 is a section on the line III—III of Figure 1 looking in the direction of the arrows.
Figure 2:
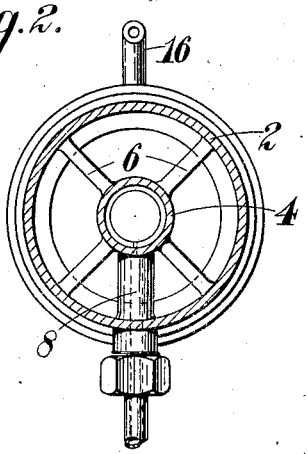
Figure 2 is a section on the line 2—2 in Figure 1 looking in the direction of the arrows.

The carburetor comprises an outer tube 2 and an innner tube 4 secured concentrically within it by means of webs 6 and a boss 8. The two tubes and the webs, together with the boss 8, may be a single casting, or they may be formed in any other suitable way. The inner tube 4 is formed with a venturi constriction as shown, but this is not essential.

Both ends of the outer tube are provided with "iris" diaphragm valves 10, 12, adapted to close substantially completely and capable of being operated independently by means of links (not shown) pivoted to arms 14, 16 secured to the operating rings of the diaphragms.

Each valve, as will be seen from Figure 1, controls both tubes, the annular space between the two being first closed as the area of the diaphragm opening is reduced, after which the inner tube is progressively closed. In the form of the invention illustrated, both valves are as close as is practicable to the ends of the tube 4, but the valve 12 may be placed some distance from the end of the inner tube, or it may be dispensed with altogether, without departing from the invention.

It is not desirable to place the iris diaphragm valves with their leaves in actual contact with the end of the inner tube 4, since not only would excessive wear be caused by such an arrangement, but there would be a risk that the inner edges of the leaves might foul the end of the tube when the valve is being closed. Nor is actual contact necessary, since a space of the order of $\tfrac{1}{32}''$ between the leaves of the valve and the end of the tube is so small relative to the cross-sectional area of the tube that no appreciable leakage will occur under actual running conditions.

Accordingly it is to be understood that the term "contiguous" used herein includes the arrangement wherein the moving part of the valve and the end of the tube have a small clearance between them.

A fuel nozzle 18 passes through a bore in the boss 8 with its orifice flush or approximately flush with the inner surface of the inner tube 4, and liquid fuel is supplied through a pipe 20 from a float-chamber 22 of the conventional vented type.

If the valve 10 is fully open and the valve 12 is closed, the engine suction will cause the carburetor to be flooded, as will be readily understood, since only a minimum of air can enter the carburetor. This position of the valves is that which they would occupy when starting the engine in cold weather. If either valve is fully open and the other is in the position wherein it closes completely the space between the two tubes but leaves the inner tube 4 completely open, then fuel mixed with such air as can enter the inner tube is passed. It is to be noted that in these circumstances a different effect will be produced by the further closing of the partly closed valve, according to which valve is closed further. If, with the valve 12 fully open, the valve 10 is closed further to shut off part of the cross-sectional area of the tube 4, then the effect produced is a simple throttling, without marked change in the proportion of fuel to air. If on the other hand the valve 10 is left fully open and the valve 12 adjusted to cover up part of the tube 4, then in addition to the throttling effect the proportion of fuel to air will be increased, since the pressure within the tube 4 will be reduced by throttling of its outer end.

If both valves are wide open, then the maximum proportion of air is obtained, and this proportion may be reduced by slightly closing either of the valves.

What I claim as my invention and desire to secure by Letters Patent is:—

1. In a carburetor, in combination, an outer tube normally open at both ends, an inner tube, a fuel jet opening transversely into said inner tube, and valve means in the outer tube comprising an obturator guided to move past that end of the inner tube which is nearer the engine, and means for moving said obturator, said obturator being adapted during opening to uncover first the end of the inner tube and then to open the space between the two tubes.

2. In a carburetor, in combination, an outer tube normally open at both ends, an inner tube, a fuel jet opening into the inner tube, and separate valve means in said outer tube, one at each end of the inner tube, each comprising an obturator guided to move past the end of the inner tube and means for moving said obturator, said obturator being adapted during opening to uncover first the end of the inner tube and then to open the space between the tubes.

3. In a carburetor, in combination, an outer tube normally open at both ends, an inner tube, a fuel jet opening into the inner tube, two iris diaphragm valves located in said outer tube one adjacent one end of the inner tube, and the other adjacent the other end of the inner tube and means for operating said valves so that the leaves of each move past and in close proximity to one of the two ends of the inner tube.

In testimony whereof I affix my signature.

WILLIAM MERVYN CROFTON.